United States Patent
Zeng et al.

(10) Patent No.: US 11,824,354 B2
(45) Date of Patent: Nov. 21, 2023

(54) ONLINE STATE ESTIMATION AND TOPOLOGY IDENTIFICATION USING ADVANCED METERING INFRASTRUCTURE (AMI) MEASUREMENTS

(71) Applicant: Bigwood Technology, Inc., Ithaca, NY (US)

(72) Inventors: Lin Zeng, Ithaca, NY (US); Dong Liang, Tianjin (CN); Hsiao-Dong Chiang, Ithaca, NY (US); Gilburt L Chiang, Ithaca, NY (US)

(73) Assignee: Bigwood Technology, Inc., Ithaca, NY (US)

( * ) Notice: Subject to any disclaimer, the term of this patent is extended or adjusted under 35 U.S.C. 154(b) by 351 days.

(21) Appl. No.: 17/410,118

(22) Filed: Aug. 24, 2021

(65) Prior Publication Data
US 2023/0072795 A1   Mar. 9, 2023

(51) Int. Cl.
*H02J 13/00* (2006.01)
*G06Q 50/06* (2012.01)
(Continued)

(52) U.S. Cl.
CPC .. *H02J 13/00002* (2020.01); *G06F 18/24323* (2023.01); *G06Q 50/06* (2013.01); *H02J 3/001* (2020.01); *H02J 13/00034* (2020.01)

(58) Field of Classification Search
CPC ............ H02J 13/00002; H02J 3/001; H02J 13/00034; G06Q 50/06
See application file for complete search history.

(56) References Cited

U.S. PATENT DOCUMENTS

| 2013/0035885 A1* | 2/2013 | Sharon | H02J 3/46 703/13 |
| 2017/0336465 A1* | 11/2017 | Pignati | G01R 31/088 |
| 2020/0153273 A1* | 5/2020 | Sun | H02J 3/0012 |

FOREIGN PATENT DOCUMENTS

| CN | 111064180 A | * | 4/2020 | |
| CN | 111313405 A | * | 6/2020 | H02J 3/00 |

OTHER PUBLICATIONS

M. Farajollahi, A. Shahsavari and H. Mohsenian-Rad, "Topology Identification in Distribution Systems Using Line Current Sensors: An MILP Approach," in IEEE Transactions on Smart Grid, vol. 11, No. 2, pp. 1159-1170, Mar. 2020, doi: 10.1109/TSG.2019.2933006. (Year: 2019).*

* cited by examiner

*Primary Examiner* — Mohammad Ali
*Assistant Examiner* — Dhruvkumar Patel
(74) *Attorney, Agent, or Firm* — Tong J. Lee

(57) ABSTRACT

A computer system provides online state estimation (SE) and topology identification (TI) using advanced metering infrastructure (AMI) measurements in a distribution network. The computer system obtains input data including the AMI measurements, a network configuration, and line parameters; solves an SE and TI problem formulated from the input data and power equations of the distribution network; and periodically updates states and topology of the distribution network during power system operation. To solve the SE and TI problem, the computer system constructs a mixed-integer convex approximation programming (MICP) model to obtain an initial topology; generates neighboring spanning trees according to the MICP model and the initial topology; evaluates performance of each neighboring spanning tree with a matching index that is an indication of power flow performance; and chooses a tree topology of a (Continued)

neighboring spanning tree having a minimum matching index as a final network topology of the distribution network.

18 Claims, 7 Drawing Sheets

(51) Int. Cl.
*H02J 3/00* (2006.01)
*G06F 18/243* (2023.01)

ONLINE STATE ESTIMATION AND TOPOLOGY IDENTIFICATION USING ADVANCED METERING INFRASTRUCTURE (AMI) MEASUREMENTS

TECHNICAL FIELD

Embodiments of the invention pertain to power distribution networks and, more specifically, to state estimation (SE) and topology identification (TI) using measurements from the advanced metering infrastructure (AMI).

BACKGROUND

Topologies of medium-voltage distribution networks (MVDNs) may alter frequently to reduce line losses, handle outages, and allow more penetration of intermittent distribution generators. An accurate model for distribution networks forms the basis for most advanced applications in the distribution management system (DMS).

It is ideal to telemeter all switch statuses and transmit them in a timely manner to the control center. However, switch statuses may be outdated or incorrectly recorded due to unreported power engineering activities, e.g., manual outage restoration in the substations. Additionally, the supervisory control and data acquisition (SCADA) system in distribution networks typically does not have sufficient real-time measurements. Most MVDNs use limited current magnitude measurements for protection use.

Currently, data from an advanced metering infrastructure (AMI) can provide new opportunities for state estimation (SE) and the topology identification (TI) of MVDNs. Smart meters in the AMI system periodically collect data from energy users and send them to the utility. Specifically, a smart meter is installed on the second side of each distribution transformer to measure all users' total power consumption.

The AMI-based state estimation and topology identification, assuming known network configuration and line parameters, aims to accurately estimate the system states and network topologies of MVDNs that are structurally loopy but operationally radial. This problem is a mixed-integer nonlinear optimization programming (MINLP) problem and requires heavy computation. One kind of method applies quadratic or linearized models to approximate the nonlinear altering current (AC) model to reduce the computational burden. These models are easy to solve and work well under a light loading condition; however, as the loading condition increases, the gap between the approximation model and the AC model differs considerably. Another method assumes that micro-phasor measurement units (μPMUs) are available at all buses and estimate the node admittance matrix using the least absolute shrinkage and selection operator. However, this method seems to be quite sensitive to measurement noise, and installing μPMUs on a full scale in distribution networks can be economically prohibitive.

SUMMARY

In one embodiment, a method is developed for online state estimation and topology identification using advanced metering infrastructure (AMI) measurements in a distribution network that includes transformers, breakers, switches, and distribution lines. The method comprises obtaining input data including the AMI measurements, a network configuration, and line parameters; solving a state estimation and topology identification problem that is formulated from the input data and power equations of the distribution network; and updating states and topology of the distribution network in each of a plurality of time periods during power system operation. To solve the state estimation and topology identification problem, the method further comprises: constructing a mixed-integer convex approximation programming (MICP) model to obtain an initial topology; generating neighboring spanning trees according to the MICP model and the initial topology; and evaluating performance of each neighboring spanning tree with a matching index that is an indication of power flow performance. A tree topology of a neighboring spanning tree having a minimum matching index is chosen as a final network topology to indicate connectivity of the distribution network.

In another embodiment, a non-transitory computer-readable storage medium storing instructions which, when executed by a computer system, cause the computer system to perform online state estimation and topology identification using advanced metering infrastructure (AMI) measurements in a distribution network that includes transformers, breakers, switches, and distribution lines. The computer system is operative to perform the aforementioned method.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order to not obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
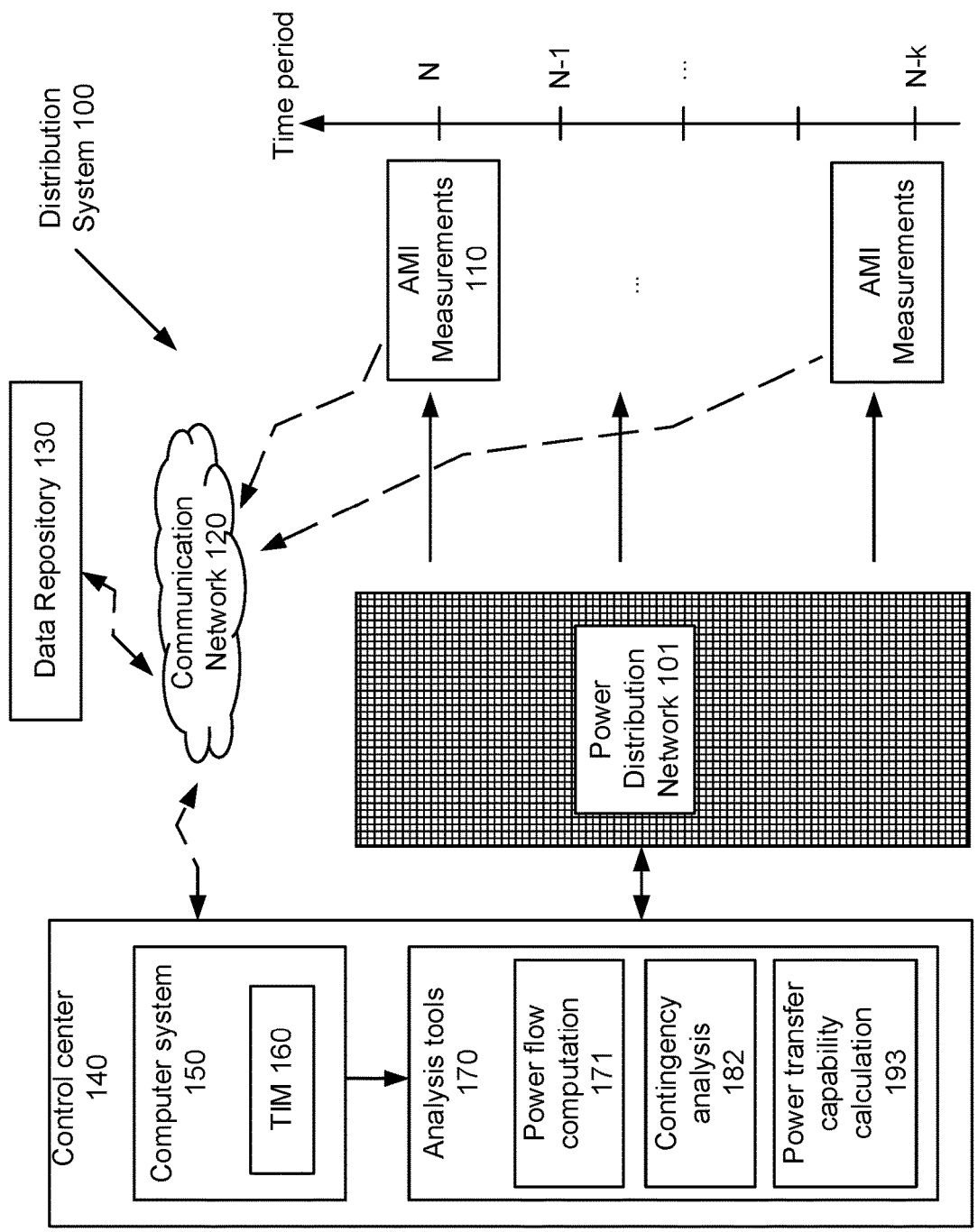
FIG. 1 illustrates a distribution system in which embodiments of the invention may operate.

FIG. 1 illustrates an example of a distribution system 100 in which embodiments of the invention may operate. Distribution system 100 includes a control center 140 where operators of distribution system 100 control the power system operations. An operator in control center 140 may monitor the system and run computer programs on a computer system 150 and control the system operation. Computer system 150 is coupled to a communication network 120, which may be a propriety wide-area network or a public network such as the Internet protected with data encryption capabilities. Distribution system 100 further includes a power distribution network 100 (also referred to as distribution network 100), which includes transformers, breakers, switches, and distribution lines.

In one embodiment, computer system 150 receives input data, including multiple snapshots of AMI measurements, and network configuration, including line parameters and switch positions. The computer system 150 periodically performs calculations of online topology identification and state estimation and sends the topology information and system states to distribution analysis tools 170. In one embodiment, the calculation performed by computer system 150 is to solve an optimization problem using a two-stage solution methodology. The calculation results, which are the solution of the optimization problem, indicate the topology of distribution network 101 (such as the statuses of the switches in distribution network 101) and the system states (such as the voltage angle and magnitude of the nodes). The topology is an indication of the connectivity of the distribution network.

In one embodiment, an online topology identification manager (TIM) 160 performs the disclosed method of online topology identification and state estimation. In one embodiment, the TIM 160 may be implemented by software stored in a non-transitory machine-readable medium readable and executable by computer system 150. Computer system 150 has access to a data repository 130 where system data is deposited. Examples of data repository 130 include, but are not limited to, dynamic random access memory (DRAM) devices, hard drives, solid-state drives (SSDs), etc. Data repository 130 may be within control center 140 or may be accessed by users such as power system operators via a user interface such as a display.

The topology of distribution network 101 may be identified periodically (e.g., every 15 minutes or any time period selected by the user). In an example where each time period is t minutes with k time periods in the horizon, the TIM 160 may calculate the online topology identification every t minutes to determine the system topology in the previous k×t minutes Taking N=3 as an example, the TIM 160 uses historical AMI data to perform the calculation for the time period (N, N−1, N−2) and obtain the topology and the states of the system for the time period (N, N−1, N−2). The calculation continues during the operation of power system 100. The efficiency of the disclosed method ensures that a solution can be quickly obtained and the solution is reliable. The reliability and efficiency of the disclosed method are significantly improved over conventional methods.

More specifically, the TIM 160 calculates the topology and states of distribution network 101 in each time period.

These results are sent to upper-level applications, such as analysis tools 170 for power flow computation 171, contingency analysis 182, and power transfer capability calculation 193. The accuracy of the computation, analysis, and calculation relies on correct network topology and state estimation.

There are usually not as many SCADA measurements in distribution networks available as in a transmission system. To address this issue, a method is disclosed herein for providing topology identification and state estimation with only AMI measurements. The disclosed method uses multiple snapshot measurements to identify the topology. A system that performs the disclosed method is also disclosed.

More specifically, the disclosed method uses a two-stage solution methodology to accurately identify the network topology. In the first stage, a mixed-integer quadratic programming (or alternatively, a linear programming) model is formulated to obtain an initial radial network topology. In the second stage, the initial radial tree topology is used as the reference tree. Apply the spanning tree generation algorithm to locally search the neighboring spanning trees of the reference tree. On each of the neighboring spanning trees, power flow computation is executed using power injection measurements as loads. The spanning tree with the best matching index between estimated and measured voltage magnitudes is selected as the final network topology. A matching index is assigned to each spanning tree to evaluate the level of its matching performance. During the local search process, spanning trees are ranked according to their matching indices, and those that show a poor matching performance are pruned to reduce computation costs. In one embodiment, a poor matching performance may correspond to a matching index greater than a predetermined threshold value.

In one embodiment, a computer program, when executed by a computer, causes the computer to perform a method for providing online topology identification and state estimation with AMI measurements. The online state estimation and topology identification may be formulated as a mixed-integer nonlinear programming (MINLP) problem to minimize the weighted least squares (WLS) objective of measurement residuals using all available measurements:

$$\min_{x,s} J(x, s) = [z - h(x, s)]^T R^{-1} [z - h(x, s)] \quad (1)$$

$$s.t. \begin{cases} x = [\delta^T V^T]^T \\ z = [(P_{flow}^{meas})^T (Q_{flow}^{meas})^T (P_{inj}^{meas})^T (Q_{inj}^{meas})^T (V_{bus}^{meas})^T]^T \\ P_i(x, s) = \sum_{i-j \in \Omega_1} s_{ij} P_{ij}, Q_i(x, s) = \sum_{i-j \in \Omega_1} s_{ij} Q_{ij} \\ P_{ij}(x) = g_{ij} V_i^2 - g_{ij} V_i V_j \cos\theta_{ij} - b_{ij} V_i V_j \sin\theta_{ij} \\ Q_{ij}(x) = -b_{ij} V_i^2 + b_{ij} V_i V_j \cos\theta_{ij} - g_{ij} V_i V_j \sin\theta_{ij} \\ \sum_{i-j \in \Omega_1} s_{ij} = n_b - n_{root}, s_{ij} \in \{0, 1\} \end{cases}$$

where z is the measurement vector, including real and reactive power injection measurements, real and reactive power flow measurements, and voltage magnitude measurements; h(.) is the vector of measurement functions; R is the covariance matrix of the measurement errors; x is the state variable vector, including voltage magnitudes and angles; $n_b$, $n_{root}$ are the number of buses and root buses; $V_i$, $V_j$ are the voltage magnitudes of buses i, j, respectively; $\theta_{ij}$ is the angle difference of buses i, j; $P_i$, $Q_i$ are the real and reactive power injection of bus i, respectively; $P_{ij}$, $Q_{ij}$ are the real and reactive power flow of line i-j, respectively; $g_{ij}$, $b_{ij}$ are the conductance and susceptance of line i-j, respectively; $s_{ij}$ is the binary variable that indicates the connectivity state of line i-j, $s_{ij}=1$ if line i-j is in operation and $s_{ij}=1$ if line i-j is out of service; and $\Omega_1$ is the set of all lines.

The measurement equations are:

$$P_{ij}^{meas} = P_{ij} + e_{P_{ij}} \quad (2)$$

$$Q_{ij}^{meas} = Q_{ij} + e_{Q_{ij}}$$

$$P_i^{meas} = \sum_{i-j \in \Omega_1} s_{ij} P_{ij} + e_{P_i}$$

$$Q_i^{meas} = \sum_{i-j \in \Omega_1} s_{ij} Q_{ij} + e_{Q_i}$$

$$V_i^{meas} = V_i + e_{V_i}$$

where $e_{P_i}$, $e_{P_{ij}}$, $e_{P_{ij}}$, $e_{Q_{ij}}$, $e_{V_i}$ are measurement errors of the corresponding measurements.

The optimal solution of the above formulation may not be the correct network topology due to large measurement noise; i.e., the formulation may be "overfitting" to noisy measurements. Since the network topology remains unchanged within a short time period, multiple measurement snapshots can be used to decrease the negative impact of measurement noise, resulting in the following multiple snapshot formulation:

$$\min_{x,s} J(x,s) = \sum_{t=1}^{N} [z_t - h_t(x_t,s)]^T R^{-1} [z_t - h_t(x_t,s)] \quad (3)$$

$$s.t. \begin{cases} x_t = [\delta_t^T V_t^T]^T \\ z_t = [(P_{flow,t}^{meas})^T (Q_{flow,t}^{meas})^T (P_{inj,t}^{meas})^T (Q_{inj,t}^{meas})^T (V_{bus,t}^{meas})^T]^T \\ P_{i,t}(x_t,s) = \sum_{i-j \in \Omega_1} s_{ij} P_{ij,t}, \quad Q_{i,t}(x_t,s) = \sum_{i-j \in \Omega_1} s_{ij} Q_{ij,t} \\ P_{ij,t}(x_t,s) = g_{ij} V_{i,t}^2 - g_{ij} V_{i,t} V_{j,t} \cos\theta_{ij,t} - b_{ij} V_{i,t} V_{j,t} \sin\theta_{ij,t} \\ Q_{ij,t}(x_t,s) = -b_{ij} V_{i,t}^2 + b_{ij} V_{i,t} V_{j,t} \cos\theta_{ij,t} - g_{ij} V_{i,t} V_{j,t} \sin\theta_{ij,t} \\ \sum_{i-j \in \Omega_1} s_{ij} = n_b - n_{root}, \quad s_{ij} \in \{0,1\} \end{cases}$$

where N is the number of measurement snapshots used; $x_t$ is the state variable vector at time t; $P_{i,t}$, $Q_{i,t}$ are the real and reactive power injection of bus i at time t, respectively; and $P_{ij,t}$, $Q_{ij,t}$ are the real and reactive power flow of line i-j at time t, respectively.

Using multiple measurement snapshots, wherein the topology of these snapshots does not change, the measurement equations become:

$$P_{ij,t}^{meas} = P_{ij,t} + e_{P_{ij,t}} \quad (4)$$

$$Q_{ij,t}^{meas} = Q_{ij,t} + e_{Q_{ij,t}}$$

$$P_{i,t}^{meas} = \sum_{i-j \in \Omega_1} s_{ij} P_{ij,t} + e_{P_{i,t}}$$

$$Q_{i,t}^{meas} = \sum_{i-j \in \Omega_1} s_{ij} Q_{ij,t} + e_{Q_{i,t}}$$

$$V_{i,t}^{meas} = V_{i,t} + e_{V_{i,t}}$$

where $e_{P_{i,t}}$, $e_{Q_{i,t}}$, $e_{Q_{ij,t}}$, $e_{V_{i,t}}$ are the measurement errors of the corresponding measurements at time t.

The proposed problem formulation is a non-convex, constrained, large-scale optimization problem. If a conventional MINLP algorithm, like the branch and bound method, is applied to directly solve the problem, one may encounter computational difficulties such as divergence and speed issues. To solve the proposed problem, the disclosed method incorporates the following aspects: (1) obtaining an initial network topology with mixed-integer convex programming (MICP), (2) neighboring spanning tree generation, and (3) finding the best-matched trees in terms of power flow comparison.

The MINLP formulation is nondeterministic polynomial (NP) hard in nature and cannot be easily solved.

In one embodiment, an effective and fast power flow method (e.g., linear power flow) and "bigM" relaxation are adopted to construct mixed-integer convex programming (MICP). This mixed-integer convex programming can be mixed-integer quadratic programming (MIQP) or mixed-integer linear programming (MILP). The mixed-integer convex programming is first formulated to obtain an initial network topology for further analysis. One advantage of the mixed-integer convex programing method is its ability to find a good solution close to the real topology quickly.

As an example, the topology identification problem is reformulated as an MIQP in the following. The MIQP formulation is shown as (5):

$$\min_{x,s} J(x,s) = [z - h(x,s)]^T R^{-1} [z - h(x,s)] \quad (5)$$

$$s.t. \begin{cases} x = [U^T P^T Q^T]^T \\ z = [(P_{flow}^{meas})^T (Q_{flow}^{meas})^T (P_{inj}^{meas})^T (Q_{inj}^{meas})^T (U_{bus}^{meas})^T]^T \\ U_i - U_j \geq -(1-s_{ij}) \cdot M + 2(P_{ij} r_{ij} + Q_{ij} x_{ij}) \\ U_i - U_j \leq (1-s_{ij}) \cdot M + 2(P_{ij} r_{ij} + Q_{ij} x_{ij}) \\ -s_{ij} \cdot M \leq P_{ij} \leq s_{ij} \cdot M \\ -s_{ij} \cdot M \leq Q_{ij} \leq s_{ij} \cdot M \\ \sum_{i-j \in \Omega_1} s_{ij} = n_b - n_{root}, \quad s_{ij} \in \{0,1\} \end{cases}$$

where $U_j$ is the squared voltage magnitude of buses i, i.e., $U_i=V_i^2$; $r_{ij}$, $x_{ij}$ are the resistance and reactance of line i-j; x is the state variable vector, including squared voltage magnitudes and real and reactive power flow variables; and M is a "bigM", which means that M is a large constant number. Furthermore, $s_{ij}$, $P_{ij}$, and $Q_{ij}$ have been defined in connection with Formulation (2). As shown in Formulation (5), $-s_{ij} \cdot M$ and $s_{ij} \cdot M$ are set as the lower bound and the upper bound, respectively, of power flow values $P_{ij}$ and $Q_{ij}$. In some embodiments, the constant value M may be chosen based on experimental results.

The measurement equations are to be modified as:

$$P_{ij}^{meas} = P_{ij} + e_{P_{ij,t}} \quad (6)$$

$$Q_{ij}^{meas} = Q_{ij} + e_{Q_{ij,t}}$$

$$P_i^{meas} = \sum_{i-j \in \Omega_1} P_{ij} + e_{P_{i,t}}$$

$$Q_i^{meas} = \sum_{i-j \in \Omega_1} Q_{ij} + e_{Q_{i,t}}$$

$$U_i^{meas} = U_{i,} + e_{U_{i,t}}$$

where $e_{U_i}$ is the measurement errors of the measurement $U_i$.

Typically, only the AMI measurements from AMI systems are available in the medium-voltage networks, and no other power flow measurements are available. These AMI measurements are available since smart meters installed on the user side are operative to measure power/energy consumption periodically. In addition, there is a primary meter installed at the second side of each distribution transformer to measure the total power/energy of all users served by this transformer. The difference between this measured value and the load of a medium-voltage node is the transformer's power loss. Therefore, the load of medium-voltage nodes can be obtained by adding the power measurements of the primary meters to the corresponding distribution transformers' power losses.

Multiple measurement snapshots are exploited in this work to reduce the negative impact of measurement noise, leading to the following multiple snapshot MIQP formulation:

$$\min_{x,s} J(x, s) = \sum_{t=1}^{N} [z_t - h(x_t, s)]^T R^{-1} [z_t - h(x_t, s)] \quad (7)$$

$$s.t. \begin{cases} x_t = [U_t^T P_t^T Q_t^T]^T \\ z_t = [(P_{inj,t}^{meas})^T (Q_{inj,t}^{meas})^T (V_{bus,t}^{meas})^T]^T \\ U_{i,t} - U_{j,t} \geq -(1-s_{ij}) \cdot M + 2(P_{ij,t} r_{ij} + Q_{ij,t} x_{ij}) \\ U_{i,t} - U_{j,t} \leq (1-s_{ij}) \cdot M + 2(P_{ij,t} r_{ij} + Q_{ij,t} x_{ij}) \\ -s_{ij} \cdot M \leq P_{ij,t} \leq s_{ij} \cdot M \\ -s_{ij} \cdot M \leq Q_{ij,t} \leq s_{ij} \cdot M \\ \sum_{i-j \in \Omega_1} s_{ij} = n_b - n_{root}, s_{ij} \in \{0, 1\} \end{cases}$$

Note that the virtual measurements have been included in $z_t$. On the other hand, we can remove the items corresponding to virtual measurements from the objective function and then add strict equality constraints to eliminate their residuals. However, when the measurement equations are formulated using the linearized power flow model, non-zero residuals of virtual measurements do not mean any anomaly, and similarly, zero residuals of virtual measurements do not imply correctness in TI. Therefore, the equality constraints are not used for virtual measurements in an approximated formulation.

Furthermore, the radial constraint cannot ensure the solution is strictly a connected tree and may result in multiple connected components, i.e., an invalid network topology. Therefore, the following radiality constraint is used to generate a radial tree. The key point is to let every bus except the root buses have exactly one parent. This is achieved by introducing two binary variables $\beta_{ij}$, $\beta_{ji}$ for each line i-j.

$$\beta_{ij} = \begin{cases} 1, & \text{bus } j \text{ is parent of bus } i \\ 0, & \text{bus } j \text{ is not parent of bus } i \end{cases} \quad (8)$$

Then the following constraints are added:

$$\beta_{ij} + \beta_{ji} = \alpha_{ij}, \quad \alpha_{ij} \in \{0, 1\} \quad (9)$$

$$\sum_{j \in N(i)} \beta_{ij} = 1, \quad i \in \Omega_b \backslash \Omega_{root}$$

$$\beta_{ij} = 0, \quad i \in \Omega_{root}, j \in N(i)$$

where $\Omega_b$, $\Omega_{root}$ are sets of all buses and root buses, respectively; $\Omega_b \backslash \Omega_{root}$ the set of all non-root buses, and $N(i)$ is the set of all neighboring buses of bus i.

The final formulation is shown as:

$$\min_{x,\alpha} J(x, \alpha) = \sum_{t=1}^{N} [z_t - h(x_t, \alpha)]^T R^{-1} [z_t - h(x_t, \alpha)] \quad (10)$$

$$s.t. \begin{cases} x_t = [U_t^T P_t^T Q_t^T]^T \\ z_t = [(P_{inj,t}^{meas})^T (Q_{inj,t}^{meas})^T (V_{bus,t}^{meas})^T]^T \\ U_{i,t} - U_{j,t} \geq -(1-\alpha_{ij}) \cdot M + 2(P_{ij,t} r_{ij} + Q_{ij,t} x_{ij}) \\ U_{i,t} - U_{j,t} \leq (1-\alpha_{ij}) \cdot M + 2(P_{ij,t} r_{ij} + Q_{ij,t} x_{ij}) \\ -\alpha_{ij} \cdot M \leq P_{ij,t} \leq \alpha_{ij} \cdot M \\ -\alpha_{ij} \cdot M \leq Q_{ij,t} \leq \alpha_{ij} \cdot M \\ \beta_{ij} + \beta_{ji} = \alpha_{ij}, \quad \alpha_{ij} \in \{0, 1\} \\ \sum_{j \in N(i)} \beta_{ij} = 1, \quad i \in \Omega_b \backslash \Omega_{root} \\ \beta_{ij} = 0, \quad i \in \Omega_{root}, j \in N(i) \end{cases}$$

Using multiple measurement snapshots, the measurement equations become $$P_{ij,t}^{meas} = P_{ij,t} + e_{P_{ij,t}} \quad (11)$$

$$Q_{ij,t}^{meas} = Q_{ij} + e_{Q_{ij,t}}$$

$$P_{i,t}^{meas} = \sum_{i-j \in \Omega_1} P_{ij,t} + e_{P_{i,t}}$$

$$Q_{i,t}^{meas} = \sum_{i-j \in \Omega_1} Q_{ij,t} + e_{Q_{i,t}}$$

$$U_{i,t}^{meas} = U_{i,t} + e_{U_{i,t}}$$

where $e_{U_{i,t}}$ is the measurement errors of the measurement $U_{i,t}$.

The proposed mixed-integer convex programming (10), either as an MILP or MIQP, can be solved by commercial solvers. However, the performance of several commercial solvers was found to be unsatisfactory. We propose a two-stage methodology to identify correct topology wherein the second stage uses the stage 1 solution as an initial guess for searching its tree neighbors, among which the one with the best matching performance is selected as the final network topology.

Stage 1: Solving the improved MICP. In the first stage, the improved MICP formulation is solved to obtain an approximated solution for the current network topology. During the construction of the MICP model, bridge lines are identified and set to a "closed" status (i.e., in operation). In one embodiment, the identified bridge lines' binary connectivity status variables α's are set to ones (i.e., closed) to reduce the feasible region. These bridge lines are set to "closed" because they have no backup power sources and reconfiguration has no effect on their statuses. An edge in an undirected connected graph is a bridge line if and only if its removal disconnects the graph. A depth-first search method can be used to identify all of the bridge lines.

Stage 2: Searching neighboring spanning trees and power flow matching. Using the MICP solution obtained in Stage 1 as the reference tree $T_0$, Stage 2 searches the tree neighbors of $T_0$ and selects the one with the best matching performance as the final network topology.

Searching the neighboring spanning tree: Since each search vector of the proposed problem formulation is a tree, we first employ a spanning tree generation algorithm. For an undirected graph G with V vertices and E edges, given one of its spanning trees $T_1$, one can obtain another spanning-tree $T_2$ by deleting one edge in $T_1$ and adding another edge in $G\backslash T_1$. This is called elementary tree transformation. The generation of neighboring spanning trees can then be achieved by using the concept of fundamental cut sets in a systematic way.

Fundamental cut set: By deleting one edge of the spanning tree, the V vertices in G are partitioned into two disjoint sets. The fundamental cut set is defined as the set of edges that must be removed from G to accomplish the same partition.

Figure 2:
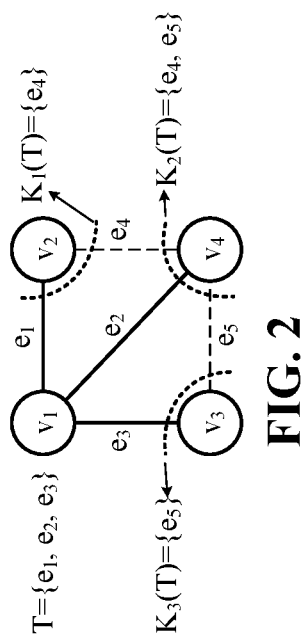
FIG. 2 illustrates an example of fundamental cut sets according to one embodiment.

Thus, each spanning tree defines a set of V−1 fundamental cut-sets. We follow the notation 1) define $K_i(T)$ as the fundamental cut set of edge $e_i$ with respect to (w.r.t) a spanning tree T; and 2) define the distance of two spanning trees $T_1$, $T_2$ as $d(T_1, T_2)$, i.e., the number of edges that are in $T_1$ but not in $T_2$. Therefore, replacing edge $e_i$ in $T_1$ by each edge $e_j$ in $K_i(T_1)$ will result in a set of neighboring spanning trees whose distance with $T_1$ is 1. A simple example is shown in FIG. 2 to illustrate the fundamental cut sets, i.e., replacing edge $e_1$ in T by edge $e_4$ will result in a neighboring spanning tree.

Figure 3B:
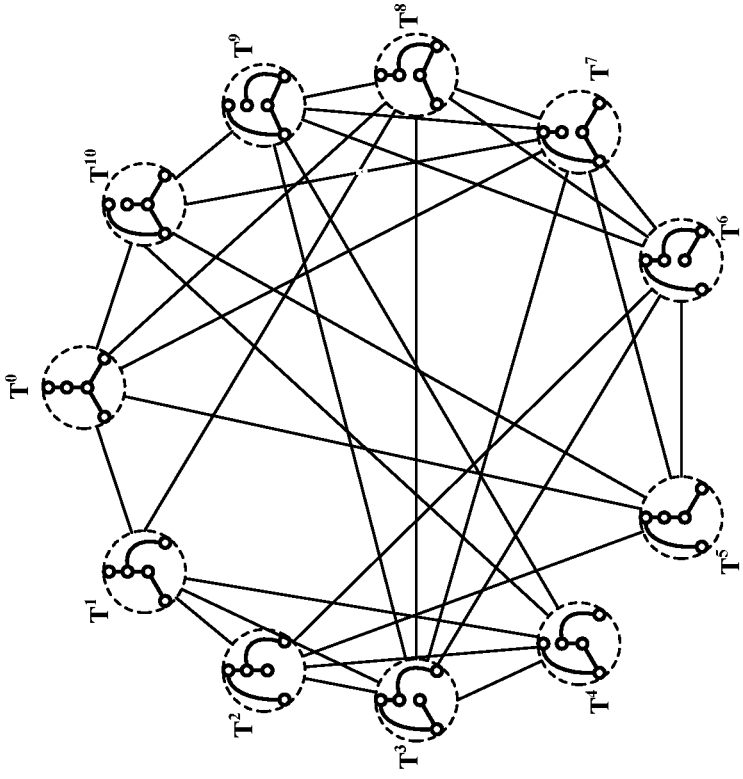
FIG. 3A and FIG. 3B illustrate an example of spanning tree generation according to one embodiment.
Figure 3A:
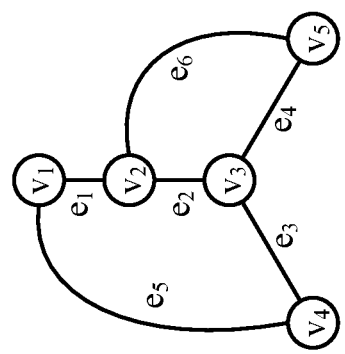

In this way, one can emulate all possible spanning trees of G from an initial reference tree $T_0$, forming a tree graph in which each vertex denotes one spanning tree of G, as shown in FIG. 3A and FIG. 3B. To avoid any duplication during the emulation, edge $e_i$ in $T_1$ is replaced by each edge $e_j$ in $K_i(T_1)$ only if edge $e_j$ is also in its fundamental cut set with respect to the reference tree $T_0$, i.e., $e_j \in K_i(T_1) \cap K_i(T_0)$.

FIG. 3A and FIG. 3B. show an example of spanning tree generation according to one embodiment. FIG. 3A shows a graph G with five vertices and six arcs. A spanning tree can be formed by connecting four of the arcs and disconnect the others. FIG. 3B shows an example of a tree graph in which each vertex (shown as a dashed circle) represents one spanning tree of G in FIG. 3A. Two spanning trees connected by a line are neighbors in this tree graph, and two neighbors can be transformed to each other by an elementary tree transformation. For instance, $T_0$ can be transformed into $T_1$ by removing arc $e_4$ and adding arc $e_6$.

Power Flow Matching: The following index (i.e., matching index) is calculated to evaluate the matching performance of each spanning tree:

$$J(s) = \sum_{t=1}^{N} [V_t^{AMI} - V_t^{Est}(s)]^T R^{-1} [V_t^{AMI} - V_t^{Est}(s)] \quad (12)$$

where $V_t^{AMI}$, $V_t^{Est}(s)$ are the measured and estimated voltage magnitude vectors by power flow calculation at time t, respectively; and R is the covariance matrix of the measurement errors. A smaller matching index of a spanning tree indicates a better match between the voltage magnitude measurements and the injection measurements under this spanning tree.

Although we can emulate all possible spanning trees of G from an initial reference tree, this will result in a huge number of spanning trees. According to the Kirchhoff matrix tree theorem, the number of spanning trees of a graph, also called the complexity of the graph, is a valuable invariant (i.e., a quantity that does not depend on the ordering of the vertices), which is equal to the determinant of any principal minor of the Laplacian matrix of the graph. This indicates that there will be a huge number of spanning trees if we emulate all possible spanning trees, which is not acceptable. Therefore, we propose to prune subtrees in the tree graph to a small number. The key is to rank all neighbors by their matching indices and only select the top k neighbors and discard all the others.

Algorithm: In this disclosure, an online method for medium-voltage distribution topology identification and state estimation is proposed. A two-stage solution methodology is proposed for the robust and efficient computation of the online state estimation and topology identification problem. In the first stage, an MICP model is first formulated to obtain an initial radial network topology. In the second stage, the initial network topology is used as the reference tree, and a spanning tree generation algorithm is then adopted to locally search its neighboring spanning trees. Then a power flow analysis is executed using AMI injection measurements as loads for each neighboring spanning tree. The best voltage matching performance between estimated and measured voltage magnitudes is selected as the final network topology. This solution methodology can find the topology reliably and is much faster than the MINLP formulation method. Through numerical implementation, the robustness and computational efficiency of the proposed methodology are verified.

Figure 4:
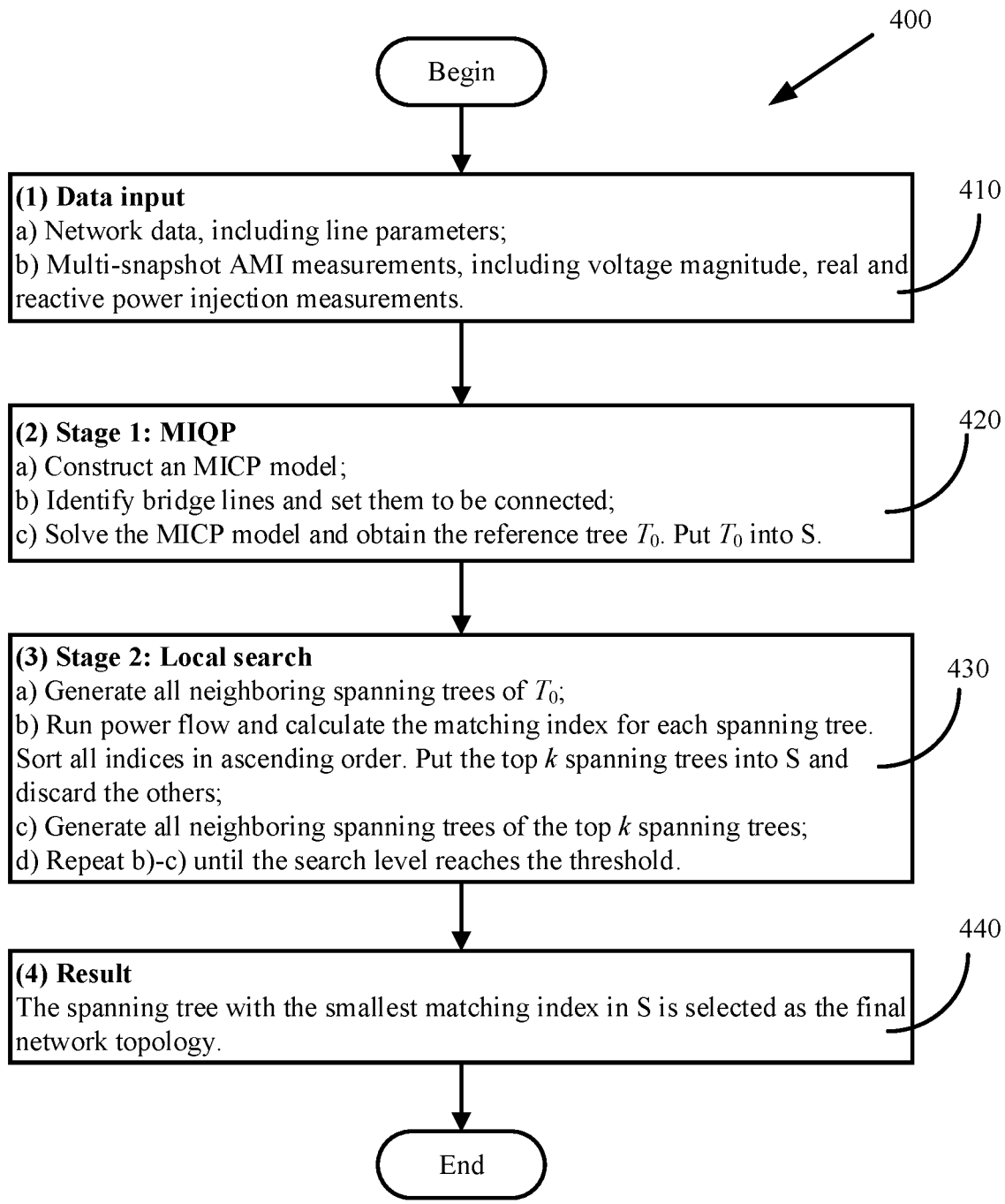
FIG. 4 is a flow diagram illustrating a method for online topology identification and state estimation according to one embodiment.

The detailed flow chart of the proposed two-stage methodology is shown in FIG. 4. FIG. 4 illustrates a flowchart of a method 400 for online topology identification in a middle-voltage distribution network that includes transformers, power distribution lines, AMI, and switches. Method 400 may be performed by a computer system, e.g., the computer system in the control center.

State estimation (SE). At present, the state-of-the-art state estimation problem is solved with the Weighted Least Squares (WLS) method:

$$\min J(x) = [z - h(x)]^T W^{-1} [z - h(x)] \quad (13)$$

where $z = h(x) + e$ is the m×1 measurement vector, x is the n×1 vector of the state variables to be estimated, h(x) is the m×1 function vector relating measurements and state variables, and e is the m×1 measurement error vector. $W = \text{diag}(\sigma_1^2, \ldots, \sigma_i^2, \ldots, \sigma_m^2)$ represents the covariance matrix of e, and $\sigma_i^2$ is the standard deviation of measurement i.

To get a higher quality of SE solution with residual constraints, constraints $|z - h(x)| \leq \beta$ are added explicitly to the model as follows:

$$\min J(x) = [z - h(x)]^T W^{-1} [z - h(x)] \quad (14)$$
$$\text{s.t.} \quad h_{zero}(x) = 0$$
$$|z - h(x)| - \beta \leq 0$$

where $h_{zero}(x)$ represents the power balance functions for zero injection power measurements and β represents a measurement residual bound.

To convert the constrained form into an unconstrained one, slack variables are added to the inequalities in (14) and use penalty factor $\alpha$ for the measurement residual constraints:

$$\min J(x,S)=[z-h(x)]^T W^{-1}[z-h(x)]+[h_{zero}(x)]^T W^{-1}[h_{zero}(x)]+\alpha([|z-h(x)|-\beta+S^2]^T W^{-1}[z-h(x)|-\beta+S^2]) \quad (15)$$

where S represents the slack variables.

An effective nonlinear solver, such as a method based on the Quotient Gradient System (QGS), is applied to solve the optimization model (15) reliably. Solving problem (15) is equivalent to finding a solution for (16):

$$H(y) = \begin{bmatrix} H_E(x) \\ H_I(x, S) \end{bmatrix} = \begin{bmatrix} z - h(x) \\ h_{zero}(x) \\ |z - h(x)| - \beta + S^2 \end{bmatrix} = 0 \quad (16)$$

$$y = (x, S)$$

Solving (16) can be converted to the problem of solving the following QGS system:

$$\dot{y} = Q_H(y) = -DH(y)^T H(y)$$

$$y=(x,S) \quad (17)$$

where DH(y) is the Jacobian matrix of H(y).

With increasing environmental concerns on carbon emissions, aggressive state-level renewable portfolio standards are spurring the adoption of renewable generation and connection of electric vehicles charging in distribution networks. However, from an operational perspective, introduction of intermittent distributed energy resources (DERs) and electric vehicles (EVs) into distribution networks raises technical challenges that need to be overcome to ensure the safe and reliable operation. For instance, intermittent photovoltaic (PV) generation depending on variations in cloud cover can cause over-voltage, voltage flicker, and excessive operation of load tap changers, and even blackout due to malfunction of protection equipment. These challenges can be addressed by advanced control strategies on controllable resources in distribution systems.

Successful management and control require a high level of network observability that is hardly fulfilled in traditional distribution networks. The advanced metering infrastructure (AMI) has been rapidly installed in distribution systems in recent years, making it possible to utilize the AMI measurements (i.e., load power and voltage magnitude data) to estimate the system states. However, the AMI measurements have low reporting rates (e.g., 30 min or 15 min) and it is difficult to capture the system states promptly between consecutive snapshots when voltage or thermal violation may occur due to fluctuation of DER outputs. Fortunately, in realistic situations, buses with high capacity DER installed (usually 2 MVA) are required to report their generation power in time (e.g., every 2 minutes). Therefore, higher resolution measurements are and can be used for state tracking of critical buses between consecutive AMI snapshots to make sure the system operates in the secure region. These critical buses include buses with large capacity DER installed, buses with EV charging stations, buses whose voltages are most vulnerable to the renewable power fluctuation, or buses supplying critical loads such as governments, hospitals, or factories.

A two time-scale state estimator is proposed to monitor system states and critical buses using different resolution measurements. For example, every 15 minutes, a computer runs the weighted least squares state estimator and obtains the whole system state using all the AMI measurements. Between the AMI snapshots, the quotient gradient system (QGS)-based state estimator is invoked using partial measurements around the critical buses to monitor the states of the critical buses. Between the two scans/snapshots, there are two modes to invoke the partial state estimation.

Mode 1: Increase the refresh rate of partial measurements, e.g., every 5 minutes, and run the partial state estimation. The partial measurements may include the AMI measurements around the key buses, the measurement at the renewable power injection node and the measurements at the EV charger bus.

Mode 2: The measurements around the key buses are sent back to the operation center and run the partial state estimation only when a large perturbation is detected. The large perturbation could be the large variation of renewable power penetration, the surge of EV charge load or large change of node voltage.

Since the partial measurements do not satisfy the system observability requirements and the weighted least squares method will fail, the QGS-based method is adopted for the partial state estimation.

The distribution network consists of several branches and laterals that span from small lines of urban areas. These lines are vulnerable to different types of electrical faults caused by a variety of reasons, such as fallen trees, extreme weather conditions, equipment malfunction, and animal contacts. Power outages resulting from these faults can last from a couple of hours to days if not identified accurately. In this context, fault location identification offers significant benefits for electric utilities to narrow down the search area and to quickly restore the electric power supply.

Modern intelligent electronic devices, fault location indicators, can be used for fault location identification. However, it is not economical to install these devices on every line. The widespread popularity of the advanced metering infrastructure (AMI) can be employed in fault locations. AMI defined as an integrated system of smart meters (SMs), communication networks, and data management systems that enable two-way communication between utilities and customers, can help utilities to quickly detect the outages and their locations.

Based on the AMI-based topology identification and state estimation methods described herein, a novel fault location identification method is developed. We consider two cases:

Case 1: No automatic load transfer after an outage. In this case, the loads downstream below the fault line are powered off and there is no automatic load transfer device to switch the breaker to continue delivering power to them. The AMI measurements of these powered-off loads are missing. We can split out a powered-off sub-system from the distribution network and the line connecting the root is the fault line. This is illustrated in FIG. 8. Loads 9, 10, 11, 12, 13, and 14 are powered off. These nodes consist of subsystems 9-10-11-12-2-13-14. Line 4-9 that connects the root node 9 is the fault line.

Case 2: With automatic load transfers after an outage. In this case, though the fault line is isolated by the relay and the loads are downstream, this line still has power due to closing the tie switches. We can identify the fault line by comparing the topologies of the pre-fault and post-fault to identify the fault line. These topologies are obtained from the AMI topology identification program. This is illustrated in FIG. 8. Before the fault, loads 55-62 and 69 are served by substation A. When a fault on line 63-69 occurs, line 63-69 is isolated by relay and line 52-55 is closed to continue delivering power. Loads 55-62 and 69 are served with substation B. By comparing the topologies of the before and post fault, we can conclude that the fault line is 63-69 and the automatic load transfer closes line 52-55 to continue serving the loads.

Method 400 begins at step 410 with the computer system obtaining power system data including network data that includes line parameters and multi-snapshot AMI measurements with voltage magnitude and real and reactive power injection measurements. At step 420, the computer system solves an MICP problem (e.g., an MIQP problem or an MILP problem, etc.) to find an initial network topology. Step 420 comprises (a) constructing an MICP model (e.g., an MIQP model, an MILP model, etc.); (b) identifying bridge lines and setting the identified bridge lines to be connected (i.e., closed); and (c) solving the MICP model and obtaining the reference tree $T_0$. At step 430, the computer system searches the neighboring spanning trees, which are generated based on the initial topology, to find the best-matched network topology. Step 430 comprises (a) generating all neighboring spanning trees of $T_0$; (b) running a power flow to calculate our proposed matching index for each neighboring spanning tree, and sorting all of the matching indices in ascending order; (c) selecting the top ranked spanning tree of step (b) and generating all neighboring spanning trees of the top k spanning trees; and d) repeating b)-c) until the number reaches a predetermined threshold. At step 440, the spanning tree with the smallest (i.e., minimum) matching index is chosen as the final topology. The computer system may periodically output the topology and the system states to the control center during power system operation.

Figure 5:
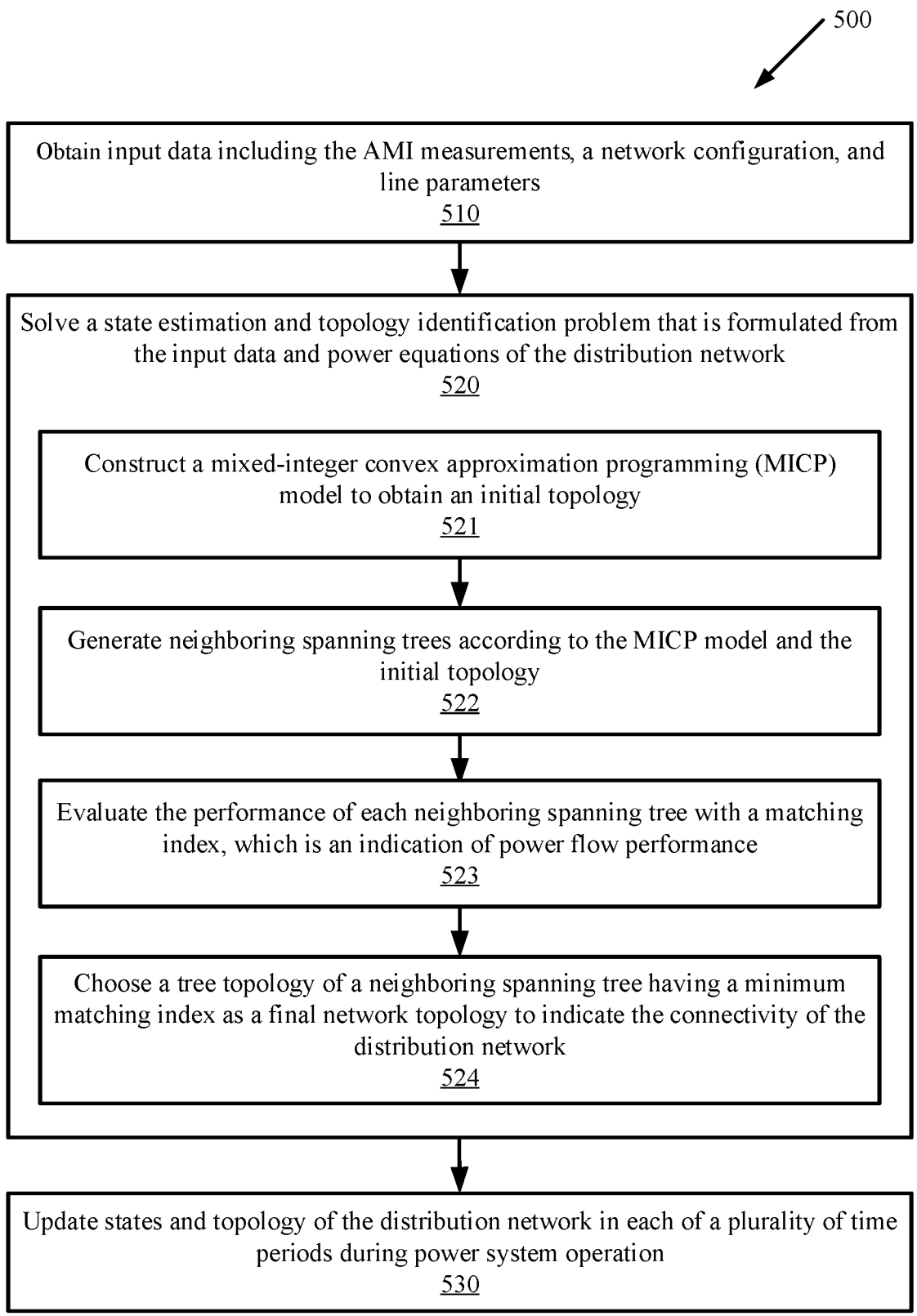
FIG. 5 is another flow diagram illustrating a method for online topology identification and state estimation according to one embodiment.

FIG. 5 is another flow diagram illustrating a method 500 for online topology identification and state estimation using AMI measurements in a distribution network according to one embodiment. The distribution network includes transformers, breakers, switches, and distribution lines. Method 500 starts with step 510 in which a computer system obtains input data including the AMI measurements, a network configuration, and line parameters. The computer system at step 520 solves a topology identification and state estimation problem that is formulated from the input data and power equations of the distribution network. Step 520 further includes sub-steps 521, 522, 523, and 524. At sub-step 521, the computer system constructs a mixed-integer convex approximation programming (MICP) model to obtain an initial topology. At sub-step 522, the computer system generates neighboring spanning trees according to the MICP model and the initial topology. At sub-step 523, the computer system evaluates the performance of each neighboring spanning tree with a matching index, which is an indication of power flow performance. At sub-step 524, the computer system chooses a tree topology of a neighboring spanning tree having a minimum matching index as a final network topology to indicate the connectivity of the distribution network. The computer system at step 530 updates states and topology of the distribution network in each of a plurality of time periods during power system operation.

Figure 6:
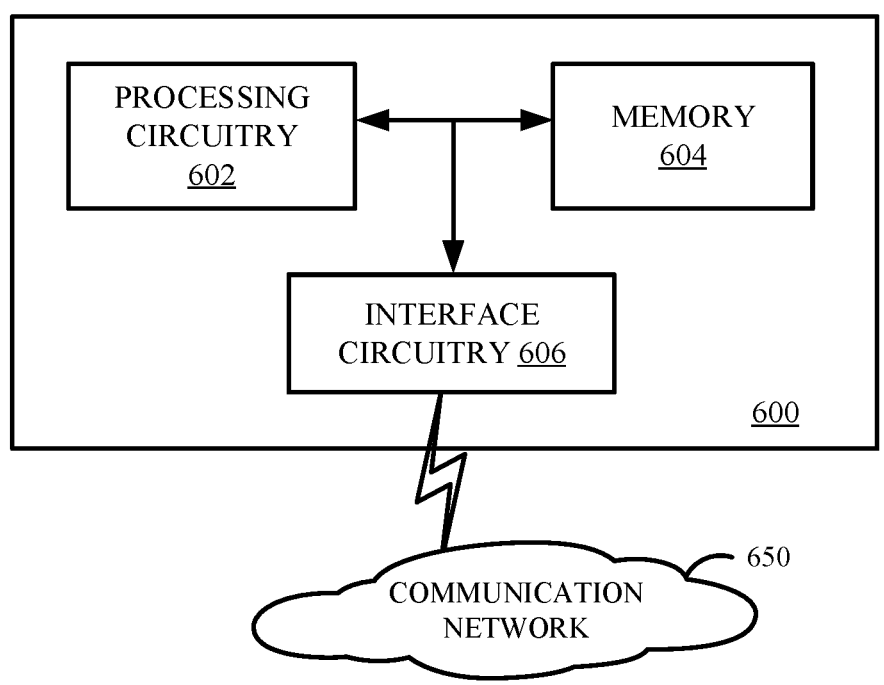
FIG. 6 is a block diagram illustrating a computer system according to one embodiment.

FIG. 6. is a block diagram of a computer system according to one embodiment. Computer system 600 is operative to perform methods 400 and 500, as well as calculations described above such as the calculations of formulations (1)-(17). Referring to FIG. 6, computer system 600 may be a server computer, a multi-processor computer, or any machine capable of executing a set of instructions (sequential or otherwise) that specifies actions to be taken by that machine. While only a single machine is illustrated, the term "machine" shall also be taken to include any collection of machines (e.g., computers) that individually or jointly executes a set (or multiple sets) of instructions to perform any one or more of the methodologies discussed herein. In one embodiment, computer system 600 includes circuitry that further includes processing circuitry 602, a memory 604 or instruction repository, and interface circuitry 606. Interface circuitry 606 can include at least one input port and at least one output port; memory 604 contains instructions executable by processing circuitry 602 whereby computer system 600 is operable to perform the various embodiments as described herein, including methods of FIG. 4 and FIG. 5. In one embodiment, a part or all of the data and code for performing the various embodiments described herein may be received over a communication network 650 via network interface 606.

Figure 7:
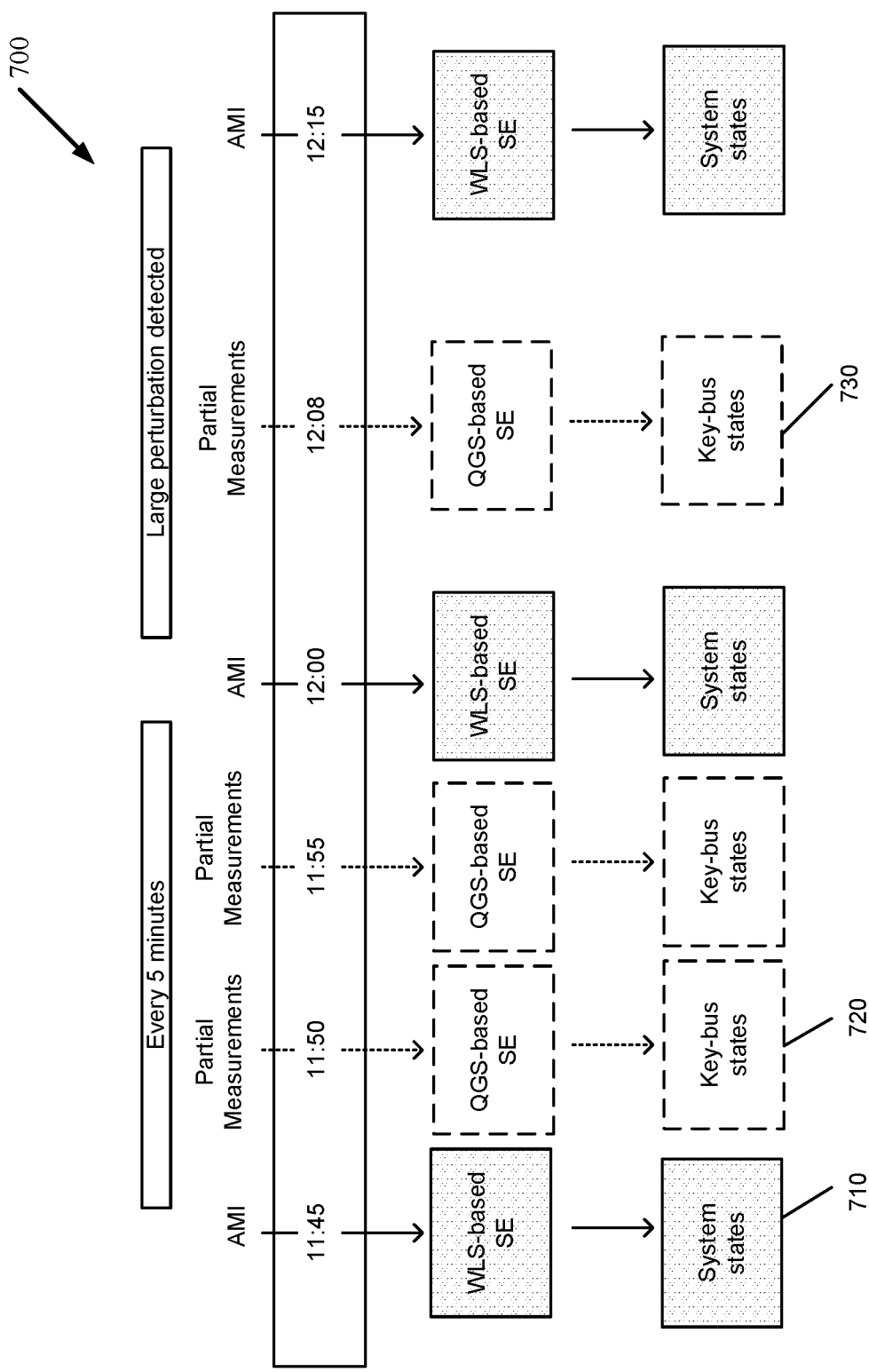
FIG. 7 illustrates a two-timescale state estimation method with AMI measurements according to one embodiment.

FIG. 7 illustrates a two-timescale state estimator. The regular state estimation 710 is executed every 15 minutes to estimate the whole system's states. Between every 15 minutes, the partial state estimation can be invoked in two modes. A first mode 720 is executed with higher partial measurement refresh rates, e.g., 5 minutes; a second mode 730, is executed only when a large perturbation event is detected, such as large variations of renewable power penetration, a surge in the EV charge load, or a large variation of node voltages.

Figure 8B:
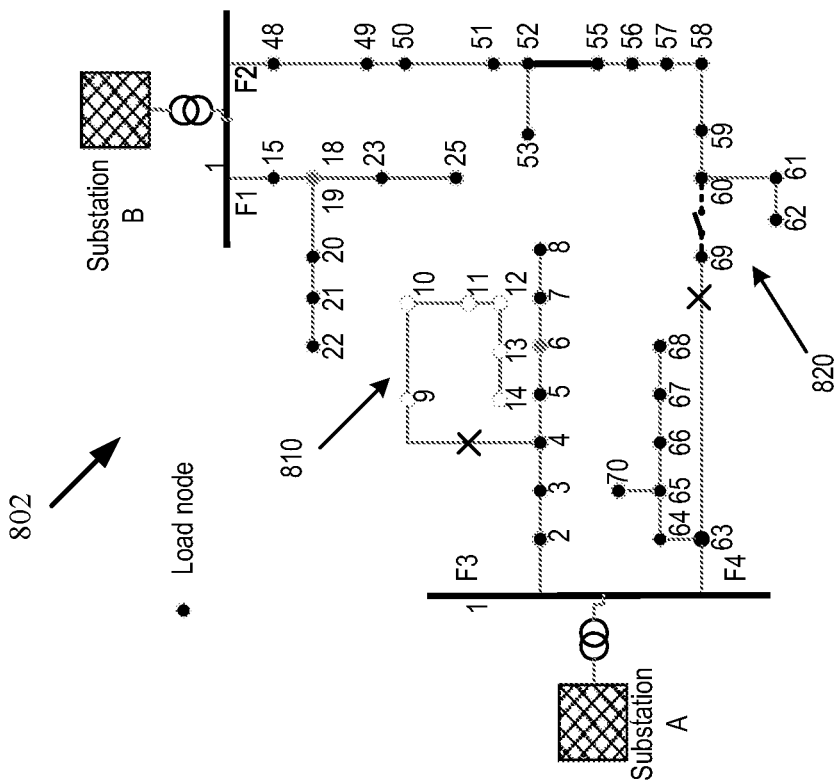
FIG. 8A and FIG. 8B illustrate fault location identification based on the AMI measurements and the identified topologies according to some embodiments.
Figure 8A:
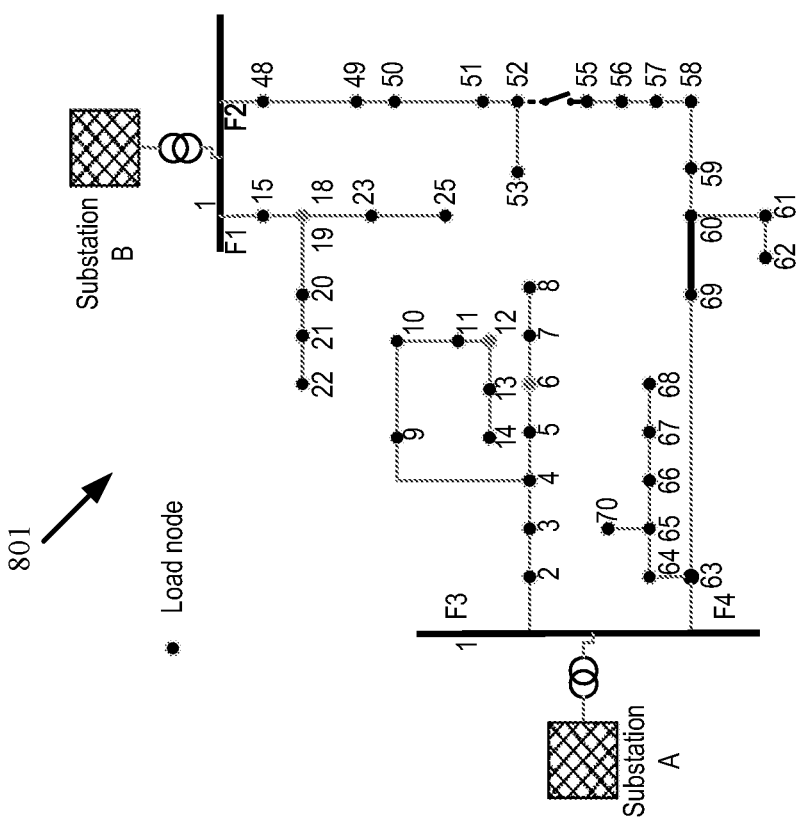

FIG. 8A and FIG. 8B illustrate the fault location identification based on the AMI measurements and the identified topologies according to some embodiments. In the case of no automatic load transfer devices 810, the fault location can be identified by analyzing the topology of the powered-off subsystem. When line 4-9 is off, loads 9, 10, 11, 12, 13, 14 are out of power. These nodes form a subsystem 9-10-11-12-2-13-14. It is obvious that line 4-9 that connects root node 9 is the fault line. In the case of automatic load transfer device 820, the fault location can be identified by comparing the topologies before and after the fault. Before the fault, loads 55-62, 69 are served by substation A. When a fault on line 63-69 occurs, line 63-69 is isolated by relay and line 52-55 is closed to continue delivering power. Loads 55-62, 69 are served with substation B. By comparing the topologies of before and post fault, we conclude that the fault line is 63-69 and the automatic load transfer closes line 52-55 to serve the loads.

Embodiments may be represented as a software product stored in a machine-readable medium (such as the non-transitory machine-readable storage media, also referred to as a computer-readable medium having a computer-readable program code embodied therein). The non-transitory machine-readable medium may be any suitable tangible medium, including but not limited to a magnetic optical or electrical storage medium including a diskette, compact disk read-only memory (CD-ROM), digital versatile disc read-only memory (DVD-ROM) or a memory device (volatile or non-volatile) such as a hard drive or solid-state drive, or a similar storage mechanism. The non-transitory machine-readable medium may contain various sets of instructions, code sequences, configuration information, or other data which, when executed, cause one or more processors to perform steps in a method according to an embodiment described above. Those of ordinary skill in the art will appreciate that other instructions and operations necessary to implement the described embodiments may also be stored on the machine-readable medium. Software running from the machine-readable medium may interface with circuitry to perform the described tasks.

Various functional components or blocks have been described herein. As will be appreciated by persons skilled in the art, the functional blocks will preferably be implemented through circuits (either dedicated circuits or generalpurpose circuits that operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A method for online state estimation and topology identification using advanced metering infrastructure (AMI) measurements in a distribution network that includes transformers, breakers, switches, and distribution lines, comprising:

obtaining input data including the AMI measurements, a network configuration, and line parameters;

solving a state estimation and topology identification problem that is formulated from the input data and power equations of the distribution network;

updating states and topology of the distribution network in each of a plurality of time periods during power system operation; and when there is automatic load transfer after outage, performing fault location identification based on the AMI measurements and identified topologies of the distribution network by comparing topologies of the distribution network pre-fault and post-fault, wherein the automatic load transfer closes a distribution line that is not associated with the fault location identification to continue delivering power to loads; and wherein solving the state estimation and topology identification problem further comprises:

constructing a mixed-integer convex approximation programming (MICP) model to obtain an initial topology;

generating neighboring spanning trees according to the MICP model and the initial topology;

evaluating performance of each neighboring spanning tree with a matching index that is an indication of power flow performance; and choosing a tree topology of a neighboring spanning tree having a minimum matching index as a final network topology to indicate connectivity of the distribution network.

2. The method of claim 1, wherein obtaining the input data further comprises:

collecting multiple snapshots of the AMI measurements; and identifying bridge lines from the input data and setting the bridge lines to a closed status.

3. The method of claim 1, wherein constructing the MICP model further comprises:

applying a power flow method; and setting a lower bound and an upper bound of power flow values ($P_{ij}$, $Q_{ij}$) of line i-j to a constant value multiplied by a binary variable $-s_{ij}$ and $s_{ij}$, respectively, wherein $s_{ij}$ indicates a connectivity state of line i-j.

4. The method of claim 1, wherein constructing the MICP model further comprises:

using multiple snapshots of the AMI measurements.

5. The method of claim 1, wherein constructing the MICP model further comprises:

generating the tree topology using a radiality constraint.

6. The method of claim 1, wherein generating the neighboring spanning trees further comprises:

generating the neighboring spanning trees based on a reference tree obtained from an approximation model solution or an existing spanning tree.

7. The method of claim 1, wherein generating the neighboring spanning trees further comprises:

executing a power flow analysis for each of all the neighboring spanning trees; and computing the matching index from the power flow result of each spanning tree.

8. The method of claim 1, wherein generating the neighboring spanning trees further comprises:

searching multiple tiers of the neighboring spanning trees; and selecting a neighboring spanning tree among all of the neighboring spanning trees with the minimum matching index as the final network topology.

9. The method of claim 1, wherein solving the state estimation and topology identification problem further comprises:

estimating a state of the distribution network by formulating a residual constrained problem based on the obtained network configuration; and solving the residual constrained problem.

10. The method of claim 1, where solving the state estimation and topology identification problem further comprises:

estimating the states of the distribution network with a two-timescale state estimator;

estimating an entirety of the distribution network using all the AMI measurements in a regular time period;

estimating partial states of critical buses between two time scans using the AMI measurements at or near the critical buses; and invoking a partial state estimator in a first mode and a second mode, the first mode with an increased partial measurements refresh rate, and the second mode by starting the partial state estimator only when a perturbation event is detected.

11. The method of claim 1, further comprising:

performing fault location identification based on the AMI measurements and identified topologies of the distribution network, when there is no automatic load transfer after an outage, by searching a root of a powered-off subsystem.

12. A non-transitory computer-readable storage medium storing instructions which, when executed by a computer system, cause the computer system to perform online state estimation and topology identification using advanced metering infrastructure (AMI) measurements in a distribution network that includes transformers, breakers, switches, and distribution lines, the computer system operative to:

obtain input data including the AMI measurements, a network configuration, and line parameters;

solve a state estimation and topology identification problem that is formulated from the input data and power equations of the distribution network;

update states and topology of the distribution network in each of a plurality of time periods during power system operation; and when there is automatic load transfer after outage, perform fault location identification based on the AMI measurements and identified topologies of the distribution network by comparing topologies of the distribution network pre-fault and post-fault, wherein the automatic load transfer closes a distribution line that is not associated with the fault location identification to continue delivering power to loads; and wherein, when solving the state estimation and topology identification problem, the computer system is further operative to:

construct a mixed-integer convex approximation programming (MICP) model to obtain an initial topology;

generate neighboring spanning trees according to the MICP model and the initial topology;

evaluate performance of each neighboring spanning tree with a matching index that is an indication of power flow performance; and choose a tree topology of a neighboring spanning tree having a minimum matching index as a final network topology to indicate connectivity of the distribution network.

13. The non-transitory computer-readable storage medium of claim 12 wherein, when obtaining the input data, the computer system is further operative to:

collect multiple snapshots of the AMI measurements; and identify bridge lines from the input data and setting the bridge lines to a closed status.

14. The non-transitory computer-readable storage medium of claim 12 wherein, when constructing the MICP model, the computer system is further operative to:

use multiple snapshots of the AMI measurements.

15. The non-transitory computer-readable storage medium of claim 12, wherein when generating the neighboring spanning trees, the computer system is further operative to:

search multiple tiers of the neighboring spanning trees; and select a neighboring spanning tree among all of the neighboring spanning trees with the minimum matching index as the final network topology.

16. The non-transitory computer-readable storage medium of claim 12, wherein when solving the state estimation and topology identification problem, the computer system is further operative to:

estimate a state of the distribution network by formulating a residual constrained problem based on the obtained network configuration; and solve the residual constrained problem.

17. The non-transitory computer-readable storage medium of claim 12, wherein when solving the state estimation and topology identification problem, the computer system is further operative to:

estimate the states of the distribution network with a two-timescale state estimator;

estimate an entirety of the distribution network using all the AMI measurements in a regular time period;

estimate partial states of critical buses between two time scans using the AMI measurements at or near the critical buses; and invoke a partial state estimator in a first mode and a second mode, the first mode with an increased partial measurements refresh rate, and the second mode by starting the partial state estimator only when a perturbation event is detected.

18. The non-transitory computer-readable storage medium of claim 12, wherein the computer system is further operative to:

perform fault location identification based on the AMI measurements and identified topologies of the distribution network, when there is no automatic load transfer after an outage, by searching a root of a powered-off subsystem.

* * * * *